United States Patent [19]

Merritt

[11] 4,161,965
[45] Jul. 24, 1979

[54] WATER-FLOW CONTROL DEVICE

[76] Inventor: Thurman L. Merritt, 19114 E. Carroll, Glendora, Calif. 91740

[21] Appl. No.: 772,127

[22] Filed: Feb. 25, 1977

[51] Int. Cl.² .............................................. F16D 1/02
[52] U.S. Cl. ........................................ 138/45; 4/145; 138/46
[58] Field of Search ............................ 4/145, 191, 192; 239/464, 533.1; 138/43, 45, 46; 251/120

[56] References Cited

U.S. PATENT DOCUMENTS

| 2,593,315 | 4/1952 | Kraft ........................................ 138/45 |
| 2,764,183 | 9/1956 | Gollehon ................................. 138/45 |
| 2,775,984 | 1/1957 | Dahl ........................................ 138/45 |
| 2,781,058 | 2/1957 | Warhus .................................... 138/45 |
| 2,829,674 | 4/1958 | Segelhorst et al. ..................... 138/45 |
| 3,901,272 | 8/1975 | Banners et al. ......................... 138/45 |

Primary Examiner—Lenard A. Footland
Attorney, Agent, or Firm—Boniard I. Brown

[57] ABSTRACT

A water-flow control device for shower heads adapted to be positioned within the shower supply pipe adjacent the shower head, whereby the water-flow rate therethrough is considerably reduced, an varying pressure flow is automatically compensated. The device comprises a unitary body of resilient material having a central longitudinal bore to permit passage of water therethrough, the receiving end of the body being formed with a pair of oppositely inclined walls having interposed therebetween a slot defining movable shoulders which are inwardly flexed under high-flow conditions, thereby restricting water flow through the central bore.

2 Claims, 5 Drawing Figures

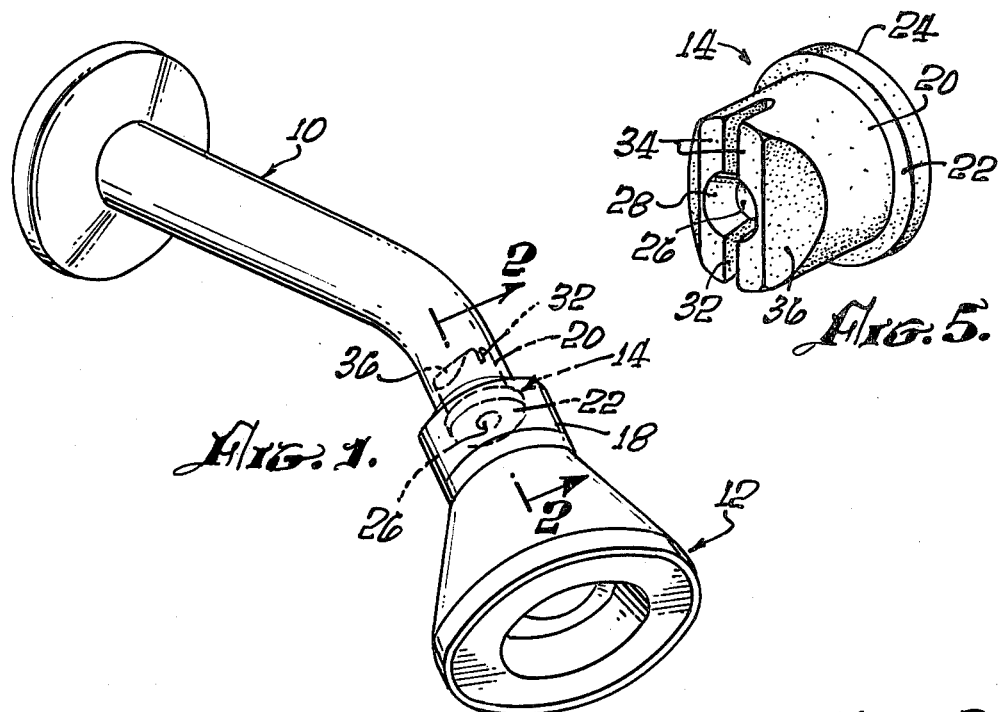
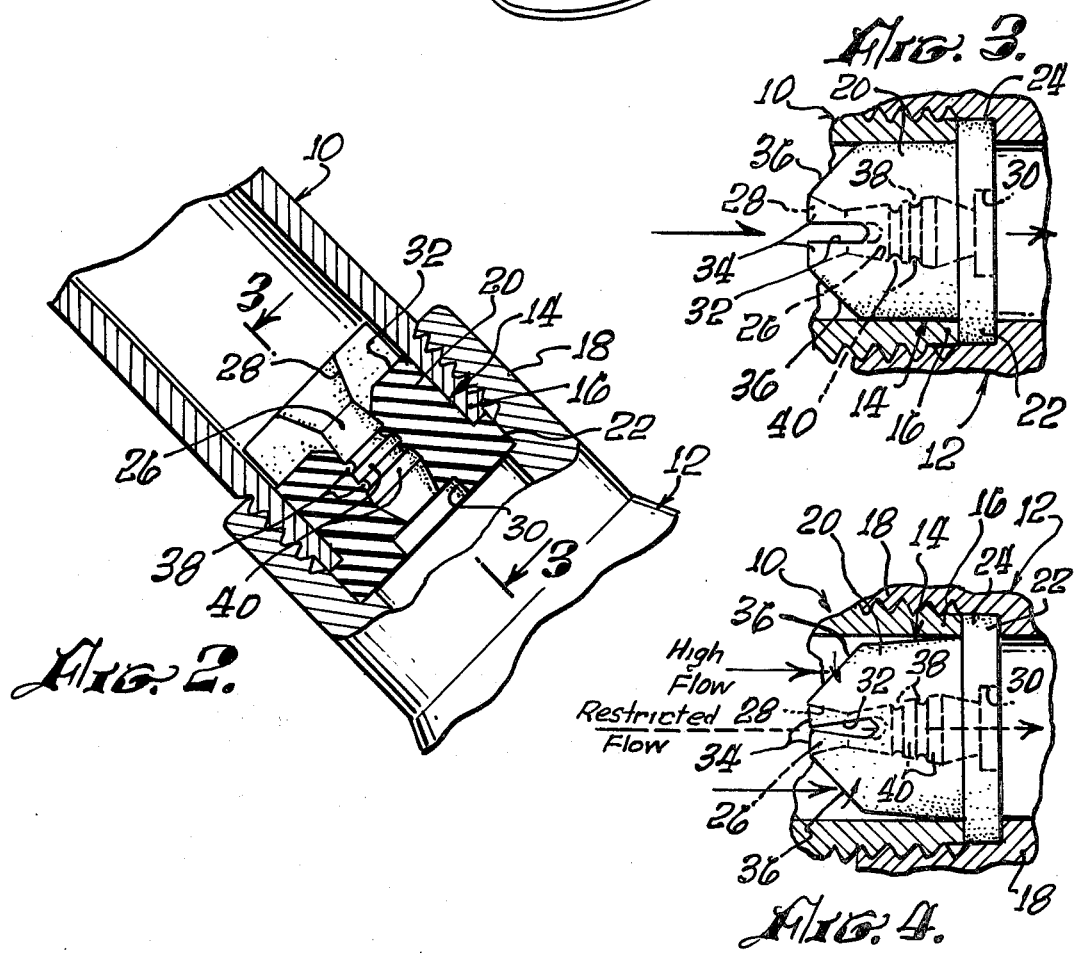

WATER-FLOW CONTROL DEVICE

BACKGROUND OF THE INVENTION

1. Field of the Invention:

This invention relates to a fluid-control valve and, more particularly, to a water-control valve adapted for use in combination with shower head devices.

2. Description of the Prior Art:

As is well known in the art, various problems and difficulties are encountered in providing suitable means for controlling the flow and pressure of water, particularly with respect to the pressure and flow of water through the conventional shower heads.

Various types of control valves have been used, and are still in use, wherein the water is controlled by a rotating valve unit which must be adjusted by the user thereof. Most of the known devices are costly or too complicated to use. They are generally positioned on or into the shower head itself. Since these known units must be operated manually, they become inoperative when the individual is too small or short to reach the device for adjustment.

Other flow control devices are so designed as to require a plumber to install, and are set for a standard condition of pressure and water flow.

SUMMARY OF THE INVENTION

The present invention has been designed as a full flow control valve, that is self-contained and pressure-compensating in providing flow control automatically. The device comprises a unitary body member having a diameter size that fits within a shower-supply line which is adapted to have the shower head secured thereto. Thus, the device is installed in the shower supply line adjacent to the shower head, thereby eliminating the requirement for a separate unit between the shower head and the supply line.

The unitary body member is formed from a resilient material, preferably rubber, so as to flex under various pressures.

Many shower heads use from 5 to 15 gallons of water per minute, whereas the average person only needs 3 gallons per minute, or less, for a satisfactory showering.

The valve of the present invention can reduce the rate to about 2½ gallons per minute.

Thus, this device conserves water, and more importantly, conserves energy, both the energy required to pump the water and the energy required to heat it.

As indicated in tests made on the control valve, the device is pressure-compensating, maintaining a desired flow rate of approximately 2½ gallons per minute under pressure variations from 20 p.s.i. to 100 p.s.i.

The inclined wall surfaces of the body member allow water pressure to exert compressive forces on the resilient material, thus urging the bifurcated portions toward each other to restrict flow therethrough. The flow area is thus restricted to over one-half of its cross-sectional area.

In addition, the central bore of the valve includes a plurality of ridges and grooves which aid in preventing noise by aerating the water, breaking up the flow, and causing turbulence. Straight flow would produce noise or a "whistling" effect, whereby the ridges break up laminar flow.

OBJECTS AND ADVANTAGES OF THE INVENTION

The present invention has for an important object to provide a full control valve device that is made from a unitary body of resilient material, wherein the water flow through a shower head is self-contained, quiet and pressure-compensating.

It is another object of the invention to provide a water-flow control valve for shower heads that is adapted to be fitted inside the shower-supply pipe adjacent the shower head, rather than having a separate unit positioned between the shower-supply pipe and shower head.

It is still another object of the invention to provide a control valve of this type that includes a flexible orifice that varies in area with the water pressure so that a constant flow rate is maintained.

It is a further object of the invention to provide a control valve of this character that is capable of reducing the water flow through the shower head from the average 7 to 10 gallons of water per minute to about 2½ gallons per minute.

It is still a further object of the invention to provide a water-flow control valve that reacts automatically because of its resilience, and includes means to cause a dispersement of the water, eliminating the loud pressure noise as the water passes therethrough.

Still another object of the invention is to provide a full flow control valve for shower heads that has no operating parts, since it is singular in construction, making the device easy to install and maintain.

A further object of the present invention is to provide a device of this character that is inexpensive to manufacture, and is simple and rugged in construction.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

DESCRIPTION OF THE DRAWINGS

Referring more particularly to the accompanying drawings, which are for illustrative purposes only:

FIG. 1 is a perspective view of a shower-supply pipe having a conventional shower head attached thereto, wherein the flow-control valve is illustrated in dotted lines;

FIG. 2 is an enlarged, cross-sectional view taken substantially along line 2—2 of FIG. 1;

FIG. 3 is a cross-sectional view taken along line 3—3 of FIG. 2;

FIG. 4 is a cross-sectional view similar to FIG. 3, showing the valve body in a collapsed mode, whereby water flow therethrough is substantially restricted; and FIG. 5 is a perspective view of the water-flow control valve.

DESCRIPTION OF THE PREFERRED EMBODIMENT

Referring more particularly to FIG. 1, there is shown a shower-supply pipe, which is generally indicated at 10, and well known in the art. Said supply pipe has a conventional shower head designated at 12 mounted thereto, also in a well known manner. The present invention, that being a water-flow control valve, is generally indicated at 14 and shown in dotted lines in its normal installation location. That is, as also seen in FIGS. 2 through 4, the valve is received in the open end 16 of supply pipe 10 and held in place by neck member 18 of shower head 12.

Accordingly, valve 14 comprises a unitary body member 20 having a general diameter of the inner diameter of said supply line 10, so as to be readily received therein. The outlet end of said valve body 20 is provided with an enlarged annular head member 22, defining an annular flange 24 to be positioned between line 10 and shower head 12. Hence, said valve is located in its preferred position relative to said shower head 12.

The main body 20 includes a central longitudinal bore 26 having an inlet orifice 28 and an outlet orifice 30, said inlet orifice 28 being somewhat conical in configuration and said outlet orifice being enlarged over the central bore 26.

A lateral slot 32 is formed in the inlet end of the valve body 20 to a point just below orifice 28. This slot 32 provides body 20 with a bifurcated end defining a pair of flexible body portions or walls 34 having inclined surface areas 36. As previously mentioned, the valve body comprises a resilient material, preferably rubber. Thus, by using such a resilient material, walls 34 are allowed to flex automatically during flow of water therethrough.

The amount of flexing or the amount of inward closing movement of the opposing body portions 34 is solely determined by exerted compressive forces created by the outflowing water pressure in pipe 10.

Accordingly, under a slow-flow low-pressure condition, the orifice 28 is in a fully open position, as seen in FIG. 3, wherein the water flow passes through bore 26 and outlet orifice 30 in an unrestricted manner.

However, as the flow increases and the pressure increases, walls 34 will gradually be urged toward each other to restrict the outward flow of water, as seen in FIG. 4. Thus, water pressure exerts compressive forces on the resilient material, particularly against inclined surfaces 36.

In addition to the above, bore 26 is provided with a noise-preventive means comprising a plurality of ridges 38 and corresponding grooves 40. Ridges and grooves 38 and 40, respectively, create an aerating effect as the water passes thereover, breaking up the flow and causing turbulence.

| With Flow Control Insert | | | |
| --- | --- | --- | --- |
| Gauge Pressure PSI | Water Flow lbs. | Water Flow GPM | Temperature °F. |
| 5 | 11.20 | 1.34 | 110° |
| 10 | 19.40 | 2.33 | |
| 15 | 20.10 | 2.42 | |
| 20 | 24.00 | 2.88 | 120° |
| 25 | 21.80 | 2.62 | |
| 30 | 20.55 | 2.47 | |
| 35 | 20.50 | 2.46 | |
| 40 | 19.65 | 2.36 | |
| 45 | 20.00 | 2.36 | 122° |
| 50 | 20.00 | 2.36 | |
| 55 | 20.00 | 2.40 | |
| 60 | 19.90 | 2.39 | |
| 70 | 19.70 | 2.36 | |
| 80 | 19.00 | 2.28 | |
| 90 | 18.80 | 2.26 | |
| 100 | 18.00 | 2.16 | 116° |

Conclusion:
Between 10 and 90 PSI water delivery pressure the shower head equipped with the flow control insert maintains a near constant water flow rate.

The invention and its attendant advantages will be understood from the foregoing description and it will be apparent that various changes may be made in the form, construction and arrangement of the parts of the invention without departing from the spirit and scope thereof or sacrificing its material advantages, the arrangements hereinbefore described being merely by way of example; and I do not wish to be restricted to the specific form shown or uses mentioned, except as defined in the accompanying claims.

The inventor claims:

1. A liquid flow-control device for positioning between a shower-supply pipe and a shower head, said device comprising:
   a main annular body member formed of a resilient material having a central longitudinal bore disposed therethrough,
   an inlet orifice,
   an outlet orifice,
   flow-restrictive means integral with said body member, said flow restrictive means being controlled by exerted compressive forces of liquid flow,
   oppositely disposed, flexible body portions defined by a slot extending laterally across the inlet orifice to define the bifurcated portions adjacent the inlet orifice to restrict the opening of said orifice when said flexible wall members are forced inwardly by said compression forces applied against said inclined wall surfaces,
   each of said body portions including an inclined wall surface,
   said body member including an enlarged annular flange member formed on the end of the body member opposite the flexible body portions and wherein said outlet orifice being disposed therein, and
   aerating means formed within said bore comprising a plurality of ridges and corresponding grooves formed within said bore interposed between said inlet and outlet orifices.

2. A liquid flow-control device as recited in claim 1, wherein said resilient material is rubber.

* * * * *